United States Patent [19]

Kohama et al.

[11] 4,414,847
[45] Nov. 15, 1983

[54] GAS FLOW MEASURING APPARATUS

[75] Inventors: Tokio Kohama, Nishio; Hisasi Kawai, Toyohashi; Hideki Obayashi, Okazaki; Tsuneyuki Egami, Aichi, all of Japan

[73] Assignee: Nippon Soken, Inc., Nishio, Japan

[21] Appl. No.: 286,344

[22] Filed: Jul. 23, 1981

[30] Foreign Application Priority Data

Jul. 28, 1980 [JP] Japan ................................. 55-104048

[51] Int. Cl.³ .............................................. G01F 1/68
[52] U.S. Cl. ......................................... 73/204; 73/118
[58] Field of Search ..................... 73/204, 118; 338/25

[56] References Cited

U.S. PATENT DOCUMENTS

| 3,441,893 | 4/1969 | Gordon et al. ............... 338/25 X |
| 3,742,761 | 7/1973 | Randall ............................ 73/204 |
| 4,244,217 | 1/1981 | Ledbetter ........................ 73/204 |
| 4,335,605 | 6/1982 | Boyd ................................ 73/204 |

FOREIGN PATENT DOCUMENTS 1248563 10/1971 United Kingdom ................. 73/204
1352175 5/1974 United Kingdom ................. 73/204

Primary Examiner—Jerry W. Myracle
Attorney, Agent, or Firm—Cushman, Darby & Cushman

[57] ABSTRACT

A gas flow rate measuring apparatus for measuring the intake air flow rate of an automobile engine or the like is disclosed, which comprises a flow rate measuring tube containing an electric heater resistance wire and two temperature-dependent resistance wires, one subject to the effect of heat of the electric heater and the other free from the effect. An output signal of a voltage divider circuit including the series-connected temperature-dependent resistance wires is used to measure the gas flow rate. The electric heater resistance wire and the temperature-dependent resistance wire thermally affected thereby are wound side by side but avoiding occurrence of any short-circuit therebetween on a single support member of an electrically insulating material.

6 Claims, 11 Drawing Figures

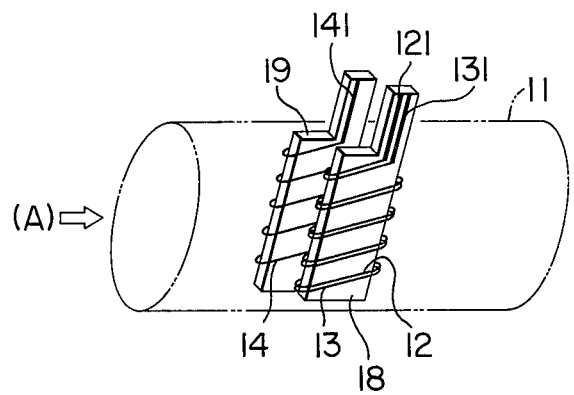
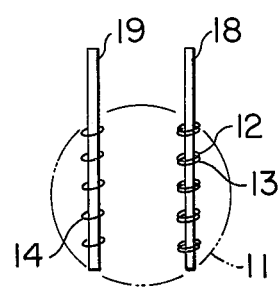
FIG. 4a  FIG. 4b
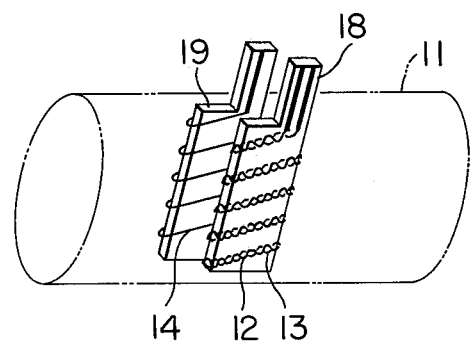
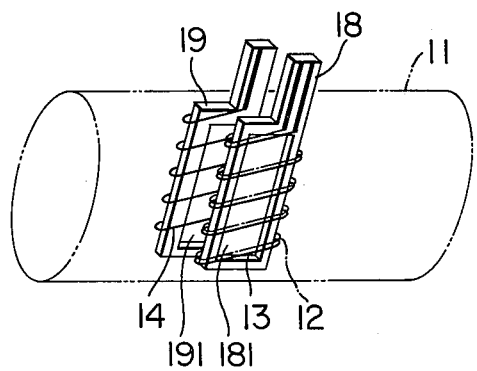
FIG. 5  FIG. 6
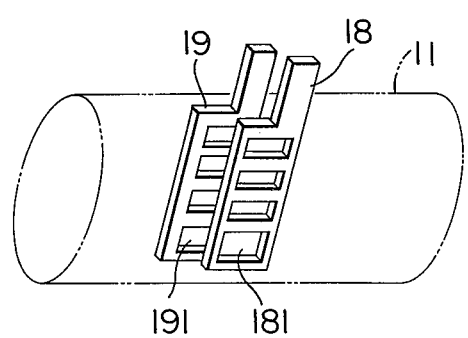
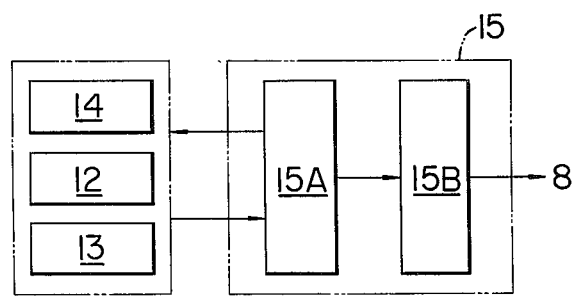
FIG. 7  FIG. 8

GAS FLOW MEASURING APPARATUS

RELATED REFERENCES

U.S. Ser. No. 188,021 filed Sept. 17, 1980, now U.S. Pat. No. 4,357,830, which was assigned to the same assignee is a copending application of this application.

BACKGROUND OF THE INVENTION

The present invention relates to a gas flow measuring apparatus useful for measuring the flow of intake air of an engine or the like.

In a fuel injection type engine, the flow rate of intake air of the engine is measured and the fuel commensurate with the flow rate is supplied by injection to the engine by way of a fuel injection valve. As an intake air flow measuring system which is applied to such a type of engine, there is known a system which comprises a measuring tube in an engine intake manifold, which measuring tube in turn contains a pair of temperature-dependent resistance wires and a resistance wire for electric heater made of platinum, and the output signals of these devices are used to measure the flow rate of intake air (i.e., the gas to be measured). Such an apparatus has essentially an advantage that the flow rate can be measured accurately with a compact and simple construction.

In the prior art apparatuses of this type, the resistance wire for the electric heater and the first and second temperature-dependent resistance wires are made of a very thin platinum wire independently suspended in the flow of intake air on separate supporters.

This construction is such that when the platinum resistance wire is subjected to a shock due to a backfiring (which is a phenomenon caused when the ignition timing or operation timing of the intake or exhaust valve of the engine combustion system is incorrectly adjusted and the flame in the combustion chamber causes an explosive combustion of the fuel and air in the intake manifold), the very thin platinum resistance wire is likely to be easily broken.

Further, in view of the fact that the control starts for the purpose of measurement only after the temperature-dependent resistance wires have received heat from the resistance wire of the electric heater, the heat of the electric heater is required to be quickly transmitted to the temperature-dependent resistance wires for an improved response. Since the electric heater resistance wire and the first and second temperature-dependent resistance wires are mounted on separate supporters as described above, however, it is difficult to arrange the electric heater resistance wire and the first temperature-dependent resistance wire receiving heat from the former in such proximity to each other as desired, thus making impossible rapid heat transmission from the electric heater resistance wire to the first temperature-dependent resistance wire. Furthermore, a part of heat of the electric heater resistance wire is caught by the supporter thereof, thereby failing to be transmitted to the first temperature-dependent resistance wire. This results in a thermal loss and a proportionate error in flow measurement, thus deteriorating the measurement accuracy.

SUMMARY OF THE INVENTION

The present invention has been developed in order to obviate the above-mentioned disadvantages of the conventional apparatuses, and an object thereof is to provide a gas flow measuring apparatus which is long in service life and superior in both flow measuring response and measurement accuracy.

According to the present invention, there is provided a gas flow measuring apparatus comprising a resistance wire for the electric heater, first and second temperature-dependent resistance wires, and a measuring tube containing the first and second temperature-dependent resistance wires wound on a supporter, in which the electric heater resistance wire and the first temperature-dependent resistance wire for receiving the heat from the electric heater resistance wire are wound side by side on the same supporter.

As a method of arranging the electric heater resistance wire and the first temperature-dependent resistance wire closely to each other, placing them in juxtaposition or twisting them together is useful for obtaining good close relation between the wires by a simple operation.

BRIEF DESCRIPTION OF THE DRAWINGS

FIG. 4a is a perspective view of a sensor of the apparatus according to the present invention.

FIG. 4b is a sectional view of the same sensor as viewed along the arrow (A) in FIG. 4a.

FIGS. 5, 6 and 7 are perspective views of modifications of the sensor.

FIG. 8 is a block diagram showing a measuring circuit used in the present invention.

DESCRIPTION OF THE PREFERRED EMBODIMENTS

Figure 1:
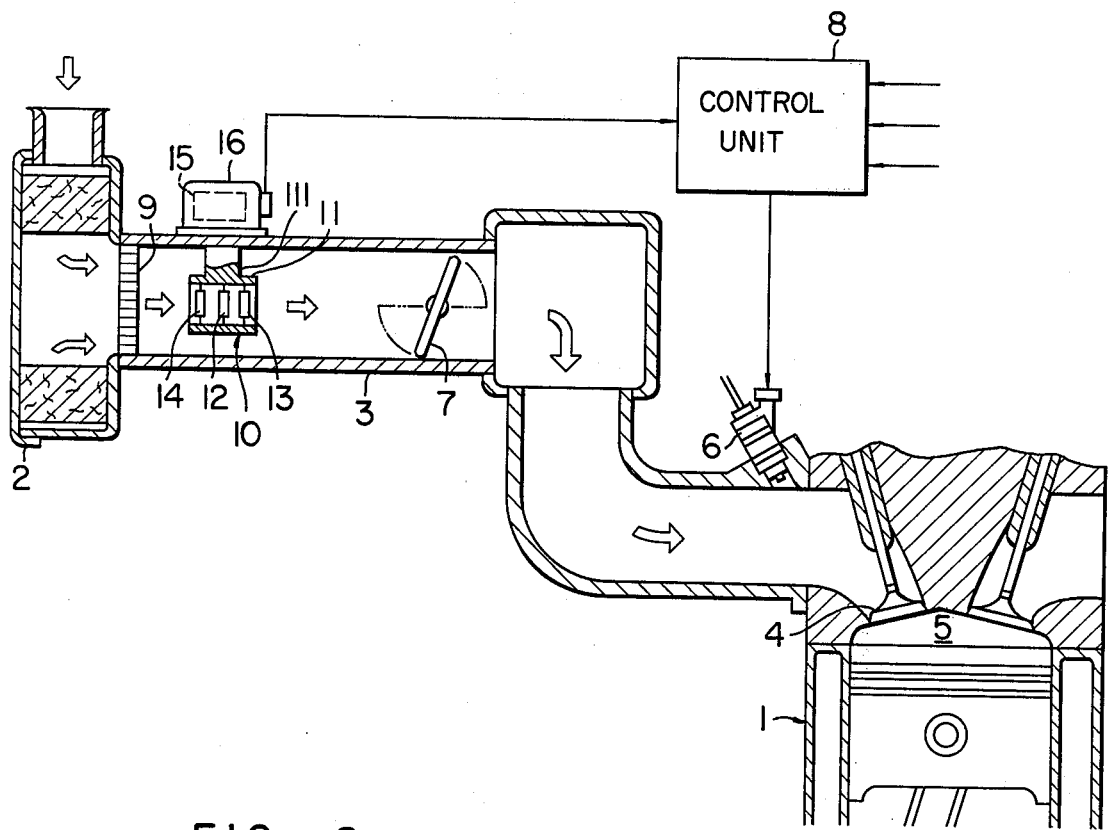
FIG. 1 is a diagram showing a configuration of an engine comprising the apparatus according to the present invention.

The present invention will be described below with reference to the embodiments shown in the drawings.

An example of the engine of fuel injection and spark ignition type having a flow measuring apparatus according to the present invention is shown in FIG. 1. In the engine 1 shown, the air for combustion is taken into the combustion chamber 5 through an air cleaner 2 and an intake tube 3 when an intake valve 4 is opened, as shown by arrows in the figure. The fuel is supplied by injection from an electromagnetic fuel injection valve 6 installed in the intake tube 3. The flow rate of the intake air is controlled by opening and closing the throttle valve 7 installed in the intake tube 3, whereas the amount of fuel injected is controlled as required to the amount substantially commensurate with the flow rate of intake air with appropriate correction as occasion demands by changing the operating time of the injection valve 6 through the control unit 8.

A rectifier grid 9 is provided directly downstream of the air cleaner 2 of the intake tube 3. This grid 9 is for rectifying the flow of the intake air and improving the accuracy of measuring the flow rate by the flow measuring apparatus described later.

In this intake system of the engine 1, the sensor section of the flow measuring apparatus 10 according to the present invention is interposed between the throttle valve 7 and the rectifier grid 9 in the intake tube 3. The apparatus 10 measures the flow rate of intake air for the engine 1 and applies an electric signal corresponding to the measured flow rate to the control unit 8. The apparatus 10 comprises a cylindrical flow rate measuring tube 11, a resistance wire 12 for the electric heater adapted to be heated by energization thereof, first and second temperature-dependent resistance wires 13, 14 of which the resistance value varies with temperature, a measuring circuit 15, and first and second support members described later.

The flow rate measuring tube 11 is secured by a support 111 with the axis thereof parallel to the axis of the intake tube 3 between the rectifier grid 9 and the throttle valve 7 in the intake tube 3. The resistance wires 12, 13 and 14 are wound on the first and second support members, being held in the measuring tube 11 and connected to the measuring circuit 15 in the manner mentioned later. The measuring circuit 15, which is contained in the case 16, is mounted on the outer wall of the intake tube 3 and connected to the control unit 8.

Figure 2:
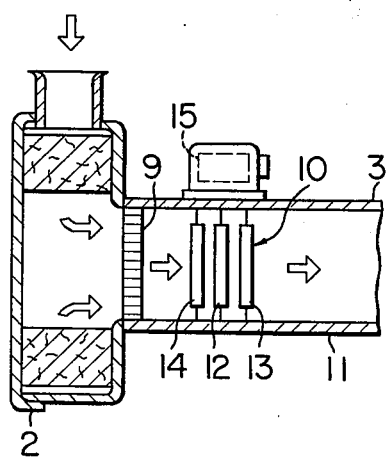
FIG. 2 is a diagram showing the construction of the essential parts of a modification of the apparatus of FIG. 1.

The flow rate measuring tube 11, instead of being constructed of a cylindrical member as described above, may be integrated with a part of the intake tube 3 as shown in FIG. 2.

Figure 3:
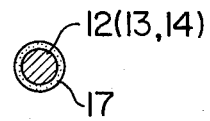
FIG. 3 is a sectional view of a resistance wire used in the apparatus according to the invention.

Sectional views of the resistance wires 12, 13 and 14 are shown in FIG. 3, and the construction of specific means for supporting the resistance wires is shown in FIGS. 4a and 4b. The resistance wires 12 to 14 are made of platinum covered with an insulating layer 17 of an electrically insulating material several μm thick thereby to be free from the effect of contamination by impurities or the like. The materials used for the insulating layer 17 include polyimide, amide-imide, polyester-imide, ceramics, glass or similar materials which have high heat resistance.

For supporting the resistance wires covered with the insulating layer 17, the first and second support members 18 and 19 as shown in FIGS. 4a and 4b are used according to the present invention. The support members 18 and 19 are formed of an electrically insulating material such as ceramics or synthetic resin of the substantially rectangular form. The electric heater resistance wire 12 and the first temperature-dependent resistance wire 13 for receiving heat from the wire 12 are wound side by side on the same support member (the first support member 18).

In other words, the first support member 18 in the plate form is wound with the platinum resistance wire for the electric heater 12 and the first temperature-dependent resistance wire of platinum 13 by a predetermined number of turns side by side or in parallel closely to each other. An end of each of the resistance wires 12 and 13 is connected to copper foils 121 and 131 respectively on one side of the first support member 18, and the other end thereof is also connected to copper foils on the other side of the support member 18 (not shown), through which the resistance wires 12 and 13 are adapted to be impressed with a voltage. The short-circuiting between the resistance wires 12 and 13 is prevented by the insulating material 17 covering them as described above. The platinum resistance wire 14 making up the second temperature-dependent resistance wire, on the other hand, is separately wound in a predetermined number of turns on the second support member 19, and the ends thereof are connected to the copper foil 141 (not shown) provided on the other side of the support member 19 for application thereto of a voltage. This second temperature-dependent resistance wire 14 has the same temperature-resistance characteristic as the first temperature-dependent resistance wire 13 mentioned above.

An alternative method of arranging the electric heater resistance wire 12 and the first temperature-dependent resistance wire 13 in close relation with each other is to twist the wires 12 and 13 together and wind them on the first support member 18 as shown in FIG. 5. It will also be seen from FIG. 6 that the first and second support members 18 and 19 may be provided with a single aperture as shown in FIG. 6; or with a plurality of openings 181 and 191 as shown in FIG. 7, and thereby making each of the support members 18 and 19 a frame. By doing so, the heat capacity of the support members 18 and 19 can be reduced, and it is possible to obtain an apparatus having an improved response characteristic. The temperature-dependent resistance wires 13 and 14 may be made of a platinum alloy or tungsten wire.

The first and second support members 18 and 19 wound with the resistance wires as described above are mounted in the flow measuring tube 11 in parallel to the air flow along the direction of arrow A flowing through the tube 11 or the second support member 19 is mounted upstream of the first support member 18. In other words, the second temperature-dependent resistance wire of the second support member 19 is held in the flow measuring tube 11 in such a positional relation with the electric heater resistance wire 12 of the first support member 17 that the electric heater resistance wire 12 does not thermally affect the second temperature-dependent resistance wire 14. Then, each of the resistance wires is connected to the measuring circuit 15 by a copper foil.

As shown in FIG. 8, the measuring circuit 15 includes a heat quantity control circuit 15A and a linearizing circuit 15B. The heat quantity control circuit 15A is for regulating the voltage applied to the bridge including the first and second temperature-dependent resistance wires 13 and 14 and the electric heater resistance wire 12 in response to the output signal of the same bridge, and the linearizing circuit 15B is for compensating the output signal of the heat quantity control circuit 15A so as to make the compensated signal in linear relation with the flow rate of intake air.

Figure 9:
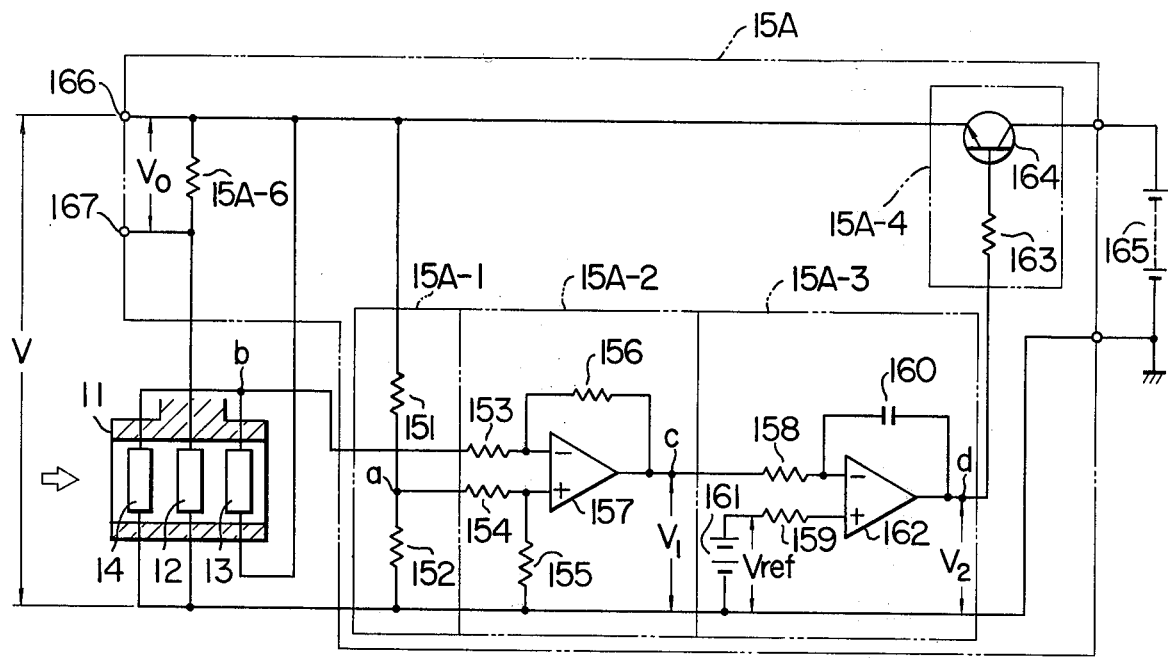
FIG. 9 is a diagram showing an electric circuit of the heat quantity control shown in FIG. 8.

A configuration of the heat quantity control circuit 15A is shown in FIG. 9. As shown in FIG. 9, the heat quantity control circuit 15A comprises generally a reference resistor 15A-1, a first differential amplifier circuit 15A-2, a second differential amplifier circuit 15A-3, a power amplifier circuit 15A-4 and an output resistor 15A-6.

The reference resistor 15A-1 includes resistors 151 and 152, and makes up a bridge with the first and second temperature-dependent resistance wires 13 and 14 as illustrated in the drawing. The first differential amplifier circuit 15A-2 includes input resistors 153, 154, a grounding resistor 155, a negative feedback resistor 156 and an operational amplifier 157 for differentially amplifying and producing at the terminal c the voltages at diagonally opposed points a and b of the bridge. The second differential amplifier circuit 15A-3, on the other hand, includes input resistors 158, 159, a capacitor 160, a reference voltage source 161 and an operational amplifier 162 for differentially amplifying and producing at the terminal d the output voltage of the terminal c and the predetermined reference voltage Vref of the reference voltage source 161. The capacitor 30 is for preventing the oscillation of the apparatus. The power amplifier circuit 15A-4 is comprised of a resistor 163 and a power transistor 164. The power transistor 164 is supplied with power from the battery 165. The power amplifier circuit 15A-4 amplifies the output voltage of the second amplifier circuit 15A-3, and applies the output thereof to the bridge and the electric heater resistance wire 12. The output resistor 15A-6 is for applying a voltage associated with the flow rate of intake air to the linearizing circuit 15B, and is connected in series with the electric heater resistance wire 12. The terminals 166 and 167 of the output resistor 15A-6 are connected to the linearizing circuit 15B.

Figure 10:
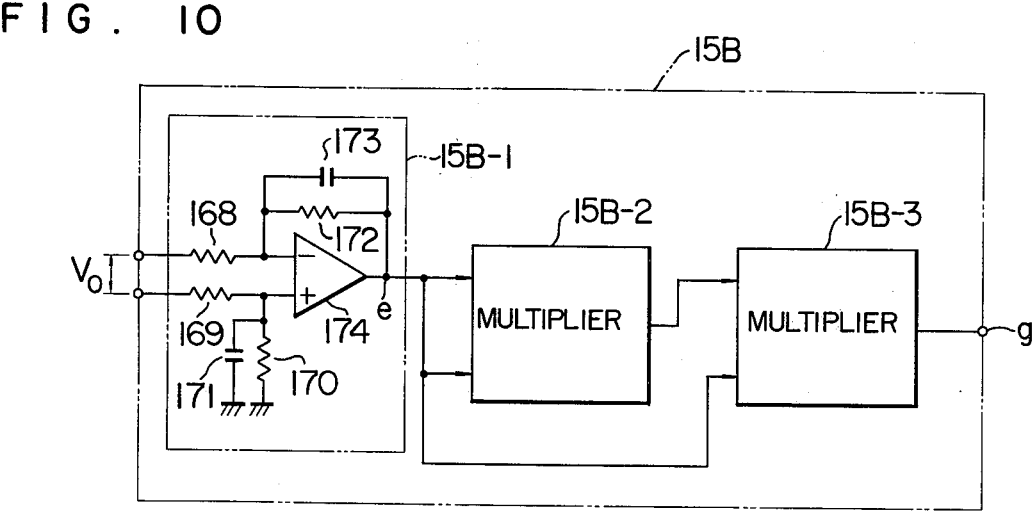
FIG. 10 is a circuit diagram showing the linearizing circuit shown in FIG. 8.

A configuration of the linearizing circuit 15B is shown in FIG. 10. As shown, the linearizing circuit 15B generally includes a differential amplifier 15B-1 and multipliers 15B-2 and 15B-3. The differential amplifier circuit 15B-1, in turn, includes input resistors 168, 169, a grounding resistor 170, a grounding capacitor 171, a negative feedback resistor 172, a capacitor 173 and an operational amplifier 174 for differentially amplifying and producing at the terminal e the output voltage of the heat quantity control circuit 15A. The multipliers 15B-1 and 15B-2 are both of an analog type for multiplying the two input voltages thereto and producing a voltage corresponding to the product thereof.

The operation of the apparatus having the above-mentioned construction will be described. A certain amount of air determined by the opening of the throttle valve 7 is taken into the engine 1 from the air cleaner 2 through the intake manifold 3. A predetermined part of total air thus taken in is taken into the engine through the flow measuring tube 11.

The second temperature-dependent resistance wire 14 disposed at a position free from the effect of the electric heater resistance wire 12 in the flow measuring tube 11 is affected only by the temperature of the support member 19 supporting the second temperature-dependent resistance wire 14, namely, the temperature of the intake air. The first temperature-dependent resistance wire 13 provided on the first support member 18 together with the electric heater resistance wire 12, on the other hand, is affected by the temperature of the first support member 18, namely, the temperature raised by the electric heater resistance wire 12 (which temperature is determined by the flow rate of the air and the heat generated by the electric heater resistance wire 12).

As a result, there occurs between the resistance wires 13 and 14 a temperature difference $\Delta T$ which is related to the power P (W) supplied to the electric heater resistance wire 12 and the flow rate of the intake air G (g/sec). The values P, G and $\Delta T$ have a relation as shown by the equation below.

$$K_1 \cdot \Delta T = P/G \quad (1) \quad (K_1: \text{Constant})$$

The resistance value of the resistors 13 and 14 varies with the air temperature, so that a potential difference $\Delta V$ determined by the voltage V applied to the bridge and the temperature difference $\Delta T$ is produced between the points a and b of the bridge (FIG. 7) as shown by the equation below.

$$\Delta V = K_2 \cdot \Delta T \cdot V \quad (2) \quad (K_2: \text{Constant})$$

From equations (1) and (2) above, the following relation is obtained:

$$K_3 \cdot \Delta V/V = P/G \quad (3) \quad (K_3: \text{Constant})$$

If the value $\Delta V$ is made constant by controlling the voltage V which is applied to the bridge and the power P supplied to the electric heater resistance wire 12, the relation between the intake air flow rate G, the power supply P and the voltage V applied to the bridge as shown below is obtained.

$$G = K_4 \cdot P \cdot V \quad (4) \quad (K_4: \text{Constant})$$

If the resistance value of the output register 15A-6 is selected small as compared with the resistance value of the heater resistance wire 12 and the current flowing through the electric heater resistance wire 12 is represented by I, there hold the following equations (5) and (6)

$$P \doteq K_5 \cdot I^2 \quad (5) \quad (K_5: \text{Constant})$$

$$V \doteq K_6 \cdot I \quad (6) \quad (K_6: \text{Constant})$$

From these equations, the equation (4) is expressed as follows.

$$G \doteq K \cdot I^3 \ldots (7) \quad (K: \text{Constant})$$
$$\doteq K' \cdot V^3 \ldots (8) \quad (K': \text{Constant})$$

Thus, the intake air flow rate G is a function of the third power of the current I (or voltage V). The approximation of the equations (7) and (8) is not to such a degree as to affect the measurement and therefore does not substantially pose any problem in practical applications.

The heat quantity control circuit 15A controls the heat quantity of the electric heater resistance wire 12 thereby to maintain the value $\Delta V$ constant. In other words, with the increase in the intake air flow rate, the temperature increase of the air heated by the electric heater resistance wire 12 is reduced, so that the temperature difference $\Delta T$ between the first and second temperature-dependent resistance wires 13 and 14 is reduced, thus reducing the potential difference $\Delta V$ between points a and b of the bridge. As a result, the output voltage $V_1$ of the first differential amplifier circuit 15A-2 is decreased, and the output voltage $V_2$ of the second differential amplifier circuit 15A-3 for generating a voltage corresponding to $Vref - V_1$ is increased. This causes the power amplifier circuit 15A-4 to increase the current supplied to the electric heater resistance wire 12 and thus increases the amount of heat generated therefrom. The temperature difference $\Delta T$ between the resistance wires 13 and 14 increases thereby to increase the potential difference $\Delta V$ between points a and b of the bridge, so that when the potential difference $\Delta V$ becomes equal to the reference voltage Vref, the whole system is balanced and the bridge is unbalanced to be in a stabilized state.

If the flow rate of intake air decreases, on the other hand, the temperature increase of the air heated by the electric heater resistance wire 12 is increased, so that the temperature difference $\Delta T$ between the resistance wires 13 and 14 increases, thereby increasing the potential difference $\Delta V$. The output voltage $V_1$ of the first differential amplifier circuit 15A-2 thus increases while the output voltage $V_2$ of the second differential amplifier circuit 15A-3 decreases, whereby the power amplifier circuit 15A-4 decreases the current supplied to the electric heater resistance wire 12, thereby reducing the quantity of heat generated. The temperature difference $\Delta T$ is reduced and the potential difference $\Delta V$ is decreased, so that when the potential difference $\Delta V$ becomes equal to the reference voltage Vref, both the system and the bridge are stabilized.

In this way, the potential difference $\Delta V$ between the points a and b of the bridge is maintained at the constant value of Vref regardless of the intake air flow rate. Equation (7) is thus established, and the intake air flow rate G is expressed as a function of the third power of the current I flowing in the electric heater resistance wire 12.

Since the current I flows also in the output resistor 15A-6, the current I is proportional to the terminal voltage $V_0$ of the output resistor 15A-6 and the third power of the voltage $V_0$ is proportional to the intake air flow rate G.

The output voltage $V_0$ of the heat quantity control circuit 15A is raised to the third power by the linearizing circuit 15B. Specifically, the terminal voltage of the output resistor 15A-6 of the heat quantity control circuit 15A is amplified by the differential amplifier circuit 15B-1, and the voltage $A_1 \cdot V_0$ is produced from the terminal e. Here, $A_1$ is the amplification factor of the circuit 15B-1. This output voltage $A_1 \cdot V_0$ is applied to the two input terminals of the multiplier 15B-2 from which the voltage $A_1^2 \cdot V_0^2$ is produced. The multiplier 15B-3 is supplied with the voltages $A_1 \cdot V_0$ and $A_1^2 \cdot V_0^2$ and produces the voltage $A_1^3 \cdot V_0^3$.

In this way, the voltage Vg proportional to the third power of the voltage $V_0$, namely, the voltage Vg proportional to the intake air flow rate is produced at the output terminal g of the linearizing circuit 15B.

This voltage Vg is applied to the control unit 8 as a signal representative of the intake air flow rate G, and the control unit 8 produces an injection pulse signal for opening the fuel injection valve 6 in response to the signal Vg. The engine 1 is thus supplied with air and fuel of an exactly corrent air-fuel ratio A/F, thus improving the exhaust gas purifying ability, output and fuel efficiency of the engine 1.

In the above-described apparatus 10 for measuring the flow rate of intake air according to the present invention, the resistance wires 12, 13 and 14 are wound on the support members 18 and 19 as mentioned above. This construction prevents the resistance wires from being broken by a shock wave attributable to the backfiring of the engine or the like, thus greatly improving the service life of the engine.

Further, since the electric heater resistance wire 12 and the first temperature-dependent resistance wire 13 for receiving heat therefrom are wound side by side on the same support member (first support member 18), all the heat of the resistance wire 12 is transmitted quickly to the resistance wire 13, thus remarkably improving the response characteristic and accuracy of the flow measurement.

The above-described embodiment is an example applied to the engine having a unidirectional flow. The apparatus 10 according to the present invention may be also applicable to engines or other devices having bidirectional flows because of the construction in which the electric heater resistance wire 12 and the first temperature-dependent resistance wire 13 are mounted side by side on the same support member.

We claim:
1. A gas flow measuring apparatus comprising
a measuring tube in which a gas to be measured flows,
a first support member made of an electric insulating material mounted at a position at the inside of said measuring tube, said position being exposed to the gas flow to be measured,
an electric heater resistance wire,
a first temperature-dependent resistance wire, said electric heater resistance wire and said first temperature-dependent resistance wire being wound side by side but avoiding occurrence of any short-circuit therebetween on said first support member,
a second support member of an electric insulating material mounted at a position at the inside of said measuring tube, said position being exposed to the gas flow to be measured and adjacent to said first support member, to be free from the effect of heat of said electric heater resistance wire in said measuring tube,
a second temperature-dependent resistance wire would on said second support member, and
a measuring circuit for applying a voltage to said electric heater resistance wire and said first and second temperature-dependent resistance wires for measuring the flow of the gas.

2. A gas flow measuring apparatus according to claim 1, wherein at leaast one of said electric heater resistance wire and said first temperature-dependent resistance wire wound on said first support member is covered with an insulating layer of an electrically insulating material.

3. A gas flow measuring apparatus according to claim 2, wherein said electric heater resistance wire and said first temperature-dependent resistance wire are wound side by side in parallel to each other on said first support member.

4. A gas flow measuring apparatus according to claim 2, wherein said electric heater resistance wire and said first temperature-dependent resistance wire are twisted with each other and wound on said first support member.

5. A gas flow measuring apparatus according to claim 1, wherein said first and second support members are provided with at least one opening therethrough.

6. A gas flow measuring apparatus comprising
a measuring tube in which a gas to be measured flows,
a first support member made of an electric insulating material mounted at a position at the inside of said measuring tube, said position being exposed to the gas flow to be measured, said first support member being plate-shaped and provided with at least one opening therethrough,
an electric heater resistance wire,
a first temperature-dependent resistance wire, said electric heater resistance wire and said first temperature-dependent resistance wire being wound side by side but avoiding occurrence of any short-circuit therebetween on said first support member,
a second support member of an electric insulating material mounted at a position at the inside of said measuring tube, said position being exposed to the gas flow to be measured and adjacent to said first support member, to be free from the effect of heat of said electric heater resistance wire in said measuring tube, said second support member being plate-shaped and provided with at least one opening therethrough,
a second temperature-dependent resistance wire would on said second support member, and
a measuring circuit for applying a voltage to said electric heater resistance wire and said first and second temperature-dependent resistance wires for measuring the flow of the gas.

* * * * *